United States Patent
Herczeg et al.

(10) Patent No.: US 11,944,936 B2
(45) Date of Patent: *Apr. 2, 2024

(54) SINGLE PASS CROSS FLOW DIAFILTRATION MODULE AND METHOD

(71) Applicant: WaterSep BioSeparations LLC, Marlborough, MA (US)

(72) Inventors: Attila Herczeg, Southborough, MA (US); Bengt G Persson, Boston, MA (US); Julie-Anne Burdick, Hudson, MA (US)

(73) Assignee: WaterSep BioSeparations LLC, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,082

(22) Filed: Dec. 14, 2021

(65) Prior Publication Data
US 2022/0105468 A1    Apr. 7, 2022

Related U.S. Application Data

(63) Continuation of application No. 16/694,997, filed on Nov. 25, 2019, now Pat. No. 11,241,656.
(Continued)

(51) Int. Cl.
*B01D 61/04* (2006.01)
*B01D 61/14* (2006.01)
*B01D 61/58* (2006.01)

(52) U.S. Cl.
CPC .......... *B01D 61/04* (2013.01); *B01D 61/149* (2022.08); *B01D 61/58* (2013.01);
(Continued)

(58) Field of Classification Search
CPC ............ B01D 2311/04; B01D 2311/12; B01D 2311/16; B01D 2313/08; B01D 2315/10;
(Continued)

(56) References Cited

U.S. PATENT DOCUMENTS

| | | | |
|---|---|---|---|
| 7,384,549 B2 | 6/2008 | De Los Reyes et al. | |
| 8,388,847 B2 | 3/2013 | Mitterer et al. | |

(Continued)

FOREIGN PATENT DOCUMENTS

| | | | |
|---|---|---|---|
| DK | WO0121290 | * | 3/2001 |
| EP | 2 732 863 A1 | | 5/2014 |

OTHER PUBLICATIONS

Fermentation and Biochemical Engineering Handbook, Ed. by Henry C. Vogel and Celeste L.Todaro, 2nd Edition, 1996, Chapter 7—Cross-Flow Filtration, Ramesh R. Bhave, pp. 271-347.
(Continued)

*Primary Examiner* — Pranav N Patel
(74) *Attorney, Agent, or Firm* — Klarquist Sparkman, LLP

(57) ABSTRACT

Disclosed herein is a single pass cross flow diafiltration system comprising: a filtration module having; two or more filtration segments fluidly connected in series, each having an upstream side and a downstream side; wherein each filtration segment comprises hollow fiber filter membranes, and wherein each filtration segment has a selected length; wherein the hollow fiber filter membranes of each filtration segment have a selected inner diameter; wherein the selected inner diameter of each filtration segment may be the same or different, provided that at least one selected inner diameter differs from another selected inner diameter, and provided that the two or more filtration segments are arranged such that no selected inner diameter in a given filtration segment is larger on the upstream side; one or more pumps, mounted to urge fluid flow; and one or more points of introduction of a diadiluent, each of said points of introduction being fluidly connected to an upstream filtration segment.

13 Claims, 5 Drawing Sheets

Related U.S. Application Data

(60) Provisional application No. 62/772,939, filed on Nov. 29, 2018.

(52) U.S. Cl.
CPC ...... *B01D 2311/04* (2013.01); *B01D 2313/08* (2013.01); *B01D 2315/10* (2013.01); *B01D 2315/14* (2013.01); *B01D 2315/16* (2013.01)

(58) Field of Classification Search
CPC ............ B01D 2315/14; B01D 2315/16; B01D 2317/02; B01D 2317/022; B01D 2317/06; B01D 2317/08; B01D 61/04; B01D 61/142; B01D 61/58; B01D 61/145; B01D 61/147; B01D 61/16; B01D 61/18; B01D 61/22; B01D 63/046; B01D 63/02; B01D 63/04; B01D 63/06; B01D 69/081
See application file for complete search history.

(56) References Cited

U.S. PATENT DOCUMENTS

| | | | |
|---|---|---|---|
| 9,821,274 B1* | 11/2017 | de los Reyes | B01D 61/18 |
| 2007/0151925 A1 | 7/2007 | Reyes et al. | |
| 2009/0277833 A1* | 11/2009 | Mir | B01D 61/22 |
| | | | 210/90 |
| 2012/0205311 A9* | 8/2012 | Kopf | C07H 1/08 |
| | | | 210/639 |
| 2015/0368602 A1 | 12/2015 | Galliher et al. | |
| 2017/0095774 A1 | 4/2017 | Reyes et al. | |
| 2017/0232390 A1 | 8/2017 | Matsuzaki et al. | |
| 2018/0298372 A1 | 10/2018 | Funkner et al. | |
| 2020/0016520 A1 | 1/2020 | Herczeg et al. | |
| 2021/0170336 A1* | 6/2021 | Goodrich | B01D 61/22 |

OTHER PUBLICATIONS

GE Document Crossflow filtration Method Handbook 29-0850-76AB, retrieved Jun. 8, 2017.

GE Document: More options. Belter results. An overview of filtration devices and systems Filtration Re-imagined Retrieved Jun. 8, 2017.

Jungbauer, Alois. "Continuous downstream processing of biopharmaceuticals." *Trends in biotechnology* 31(8): 479-492, Aug. 2013.

Liang et al., "Performance Modeling and Analysis of a Hollow Fiber Membrane System," Membra Sci Technol 6: 144. doi: 10.417212155-9589.1000144, 2016.

Millipore white paper: Protein Concentration and Diafiltration by Tangential Flow Filtration Retrieved Sep. 4, 2017.

Rucker-Pezzini et al., "Single pass diafiltration integrated into a fully continuous mAb purification process," *Biotechnology and Bioengineering* 115(8): 1949-1957, Aug. 2018.

Tien et al., "Modeling the Performance of Cross-Flow Filtration Based on Particle Adhesion," Chem, Eng. Res. and Des., Accepted Aug. 9, 2016, retrieved Apr. 6, 2017.

Wang et al., "The effects of flow angle and shear ate within the spinneret on the separation performance of poly(elhersulfone) (PES) ultrafillralion hollow fiber membranes," Journal of Membrane Science, 240, 67-79, 10.1016/j.memsci.2004.04.012., 2004.

\* cited by examiner $$B_v = F_1 + F_2 + \ldots F_n$$

$$B_w = F_{n+1} + F_{n+2} + \ldots F_{n+m}$$

$$B_{n+1} = F_1 + F_2 + \ldots F_{n+1}$$

$$B_{n+2} = F_{n+2} \text{ Or}$$

$$B_{n+2} + B_{n+1} = F_1 + F_2 + \ldots F_{n+2}$$

$$B_v = F_1 + F_2 \ldots + F_{n+m}$$

SINGLE PASS CROSS FLOW DIAFILTRATION MODULE AND METHOD

This is a continuation of U.S. patent application Ser. No. 16/694,997, filed Nov. 25, 2019 which claims the benefit of U.S. Provisional Patent Application No. 62/772,939, filed on Nov. 29, 2018, which application is incorporated by reference in its entirety.

The present application for patent is in the field of filtration and, more specifically, in the field of cross flow filtration.

BACKGROUND

Biomanufacturing employs biological systems to produce commercially important biomaterials and biomolecules used in the fields of medicine, consumer goods and industrial processes. Illustrative examples of biomanufactured products include, but are not limited to, active pharmaceuticals; monoclonal antibodies; vaccines; proteins; amino acids; enzymes; animal cells, tissues and replacement organs; biofuels; biochemicals; and 'green' products to replace petroleum-derived chemicals. Regardless of scale, biomanufacturing generally uses fluid mixtures that require purification, which frequently involve one or more filtration steps.

Continuous biomanufacturing is gaining popularity as a more efficient way of producing solutions or suspensions of the target species. Of particular interest are "single pass" processes, wherein the retained materials or the filtered materials, as the case may be, are at or slightly above the desired concentration of the target solute after the first pass such that there is no need for recirculation and/or further purification.

Of particular interest are filtration systems having hollow-fiber membranes, in which the bulk fluid or feed flows across the surface of the membrane while a portion of feed material permeates through the membrane's pores. The fluid that passes through the membrane is referred to as permeate or filtrate, and the fluid retained by the membrane is referred to as retentate. Because the permeate flow is perpendicular to the bulk fluid flow, it is also referred to as cross flow filtration. There are two flow configurations for permeate through a hollow fiber membrane: flow from inside to outside the fibers or flow from outside to inside the fibers, so either the fiber's inner surface or outer surface can present as the filtration membrane.

Under certain conditions in cross flow filtration, the filtration process induces the creation of a concentrated layer or "boundary layer" of retained species on the surface of the membrane. This phenomenon is sometimes referred to as "concentration polarization," which may reduce the permeate flux relative to initial membrane conditions and is predictable in many cases. In the absence of counter measures, the accumulation of retained particles solutes or other species on the surface of the membrane results in decreased flux and if not corrected the filtering process may not function efficiently.

Various attempts have been made to effect single pass cross-flow filtration processes. For example, in US Pat. Appl. No. US 2017/0095774 A1, de los Reyes uses a module that comprises hollow fiber filtration materials having ultra-thin radii that are characterized by thicknesses of the same order of magnitude as the thickness of a boundary layer formed as the permeate flows through the membrane, leaving a concentrate at the boundary. These channels are said to have dimensions of from 50 μm (microns) to 150 μm (microns). Within the ultrathin channels, the concentrate is periodically flushed from the wall of the membrane by the application of a back pressure, applied from the permeate compartment. This allows collection of the concentrate.

Accordingly, the system includes a module having a hollow fiber filtration membrane separating the module into a retentate compartment and a permeate compartment, a feed port fluidly coupled to a first end of the retentate compartment, a retentate port fluidly coupled to a second end of the retentate compartment, a permeate port fluidly coupled to the permeate compartment, a retentate valve coupled to the retentate port and a permeate pressurization valve coupled to the permeate port. The system further includes a cycle controller controllably connected to the retentate valve and the permeate pressurization valve. The cycle controller includes one or more of (a) a timing circuit to control the retentate valve, a load detector to control the retentate valve, or, a recovery detector to control the retentate valve, and (b) a permeate pressurization valve for applying the backpressure.

While the system disclosed supra, employs short channels, the requirement for a controller adds expense and unnecessary complexity and the back flushing step requires extensive experimentation to avoid clogging of the individual channels.

In another example, in U.S. Pat. No. 7,384,549, de los Reyes et al. disclose a single pass cross flow filtration system that includes a plurality of stages, each stage having a plurality of hollow fiber channels providing at least one serial flow path. In this system, each stage is in fluid communication with each adjacent stage preceding it and is in fluid communication with each adjacent stage that follows it. Each of the channels includes a hollow fiber filtration membrane and has a length, a membrane area, a void volume, a specific membrane area expressed as a ratio of the membrane area to the void volume, and a dimensionless length expressed as a product of the channel length and the specific membrane area. The dimensionless length of a stage is the sum of the dimensionless lengths of each channel in the longest serial flow path in the stage and the dimensionless length of the system is the sum of the dimensionless lengths of the stages. The specific membrane area of at least one channel in this system is greater than about 40 $cm^{-1}$ and the dimensionless length of the system is greater than about 2,000 and the dimensionless length of at least one of the 2,000 stages is less than about 6.000. Within each stage, two or more channels may be run in parallel. The inner diameter of the hollow fiber, called the "lumen" diameter is said to be decreased from stage to stage; thus increasing the possibility of clogging as a boundary layer builds up on the walls.

Diafiltration is a particular type of filtration that removes the original components and may replace them with different components more suitable to a particular application. In diafiltration, a suitable diadiluent, having a reduced concentration of the original low molecular weight compound or compounds and, optionally, comprising other compounds such as buffers non buffering salts, or other components, may be added to the retentate being processed. The diadiluent may replace the original volume such as by adding at about the same rate as the rate of permeation, or replace a larger or smaller volume than that of the permeate. By this means the concentration of the high molecular weight compounds in the retentate may be controlled to the desired level. Diafiltration is commonly used in the purification of biomolecules to reduce the concentration of low molecular weight contaminants as well as to replace the buffer and other components used to dissolve the target biomolecule. The techniques of diafiltration are described in various monographs, for example, "Ultrafiltration and Microfiltration," Munir Cheryan (1998), CRC Press, pp. 3012-3018.

U.S. Pat. No. 7,384,549, mentioned above, discloses single-pass TFF modules with and without internal diafiltration distribution, suitable for single-pass concentration and single-pass diafiltration processes, respectively (hereafter called "single-pass concentration modules" and "single-pass diafiltration modules"). Single-pass diafiltration modules offer the benefits of staged diafiltration systems as described above (low residence time of the fluid being processed and no recirculation loop). However, single-pass diafiltration modules may suffer from changes in the diafiltered product. These may be changes in viscosity or other rheological changes introduced by the new components or because of higher concentration. Such changes in viscosity may slow flow rates considerably through small fibers or introduce unacceptably high shear stresses at practical flow rates. Therefore, there remains a need for a single pass diafiltration method that will allow robust diafiltration and allow intermediate and final products to flow freely at reduced shear stresses. These concerns are addressed by the methods and the plurality of apparatus examples disclosed herein.

The drawings are not necessarily to scale and no such intention should be inferred except that the filtration segments are arranged such that no selected inner diameter hollow fiber inner diameter is larger on the upstream side of the filtration chain.

DETAILED DESCRIPTION OF THE DRAWINGS

FIGS. 1-5 depict schematic diagrams of various embodiments of continuous and discontinuous cross flow diafiltration system having a plurality of filtration segments, wherein each filtration segment has an upstream side and a downstream side, inferred from the arrows depicting the fluid connections. The selected inner diameter of each filtration segment in the system may be the same or different, provided that at least one selected inner diameter differs from another selected inner diameter, and provided that the filtration segments are arranged such that no selected inner diameter in a given filtration segment is larger than the inner diameters in a filtration segment on the upstream side. The filtration segments are configured with fluid connections and pumps according to the present description. Arrowheads in the fluid lines are intended to depict the usual direction of fluid flow. Fibers are depicted schematically; wherein such depiction is not intended to limit the number or configuration of the fibers within a filtration segment. For example, the fibers may be aligned in parallel as shown, randomly, in serpentine fashion, or otherwise coiled, twisted or bundled. Fluid lines may include control features such as pumps (shown) and/or valves (not shown). In addition, segments of fluid lines may be labeled for convenient reference. In the Figures, values labeled $F_n$ represent permeate volumes or flow rates during a given time segment, values labeled $B_n$ represent diadiluent volumes or flow rates during a given time segment, and $R_n$ represents reservoirs having the target solution at various process stages.

Figure 1:
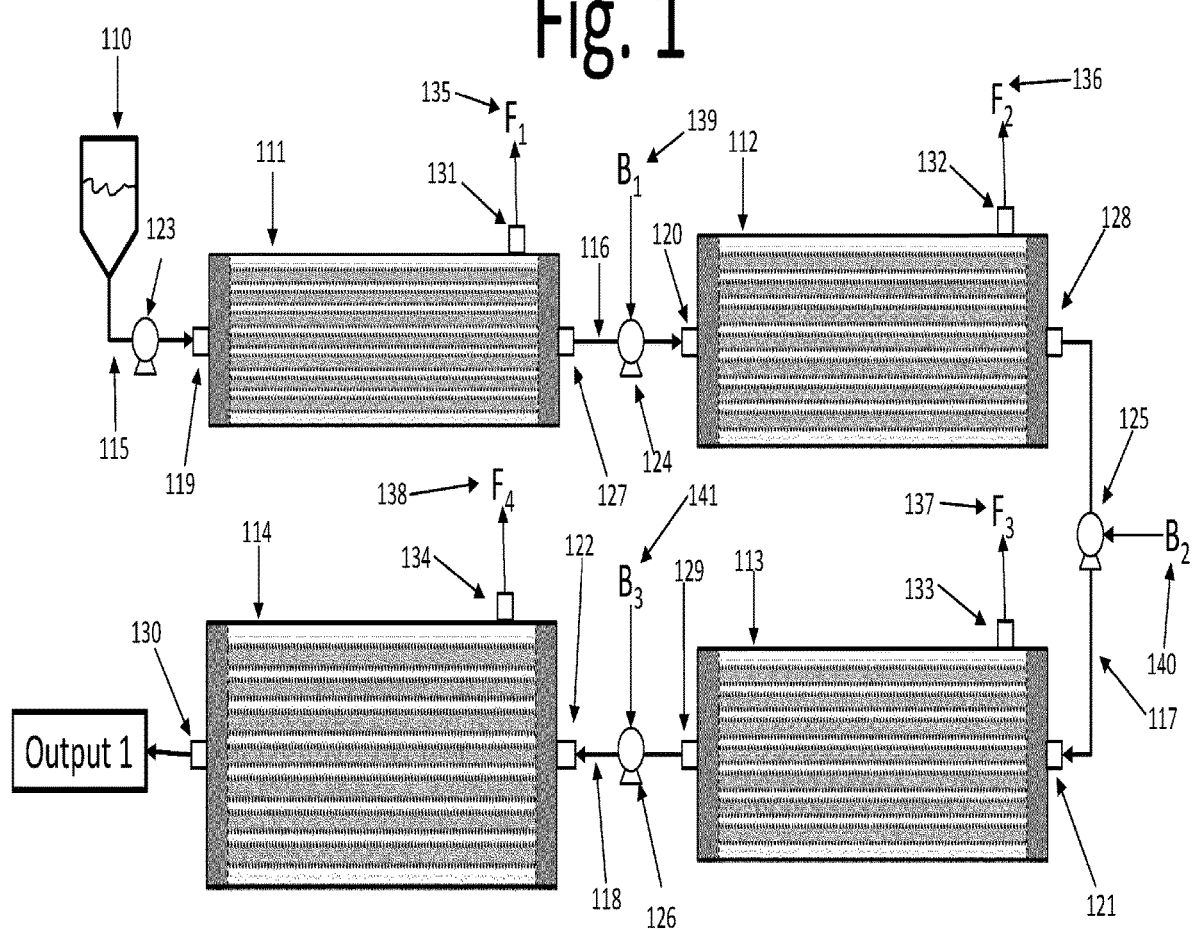
FIG. 1 depicts a schematic diagram of one embodiment of a cross flow continuous diafiltration system having four filtration segments, four filtrate ports and three points of introduction of diadiluent.

Shown in FIG. 1 is a schematic diagram of one embodiment of a cross flow continuous diafiltration system having four filtration segments, four filtrate ports and three points of introduction of diadiluent. The fluid to be diafiltered is fed from reservoir 110 via line 115, urged by pump 123 into entry port 119 of the first cross flow filtration stage, 111. The permeate or filtrate 135 exits the filtration stage via filtrate exit port 131, while the retentate exits the filtration stage via exit port 127. The retentate in line 116 is then diluted with diadiluent $B_1$ 139. In like manner, retentate from each filtration stage 112-114 is passed to the next step in the process via entry ports 120-122. Permeates 136-138 exit their respective filtration stages via permeate ports 132-134. Retentate fluids exit their respective filtration stages via exit ports 128-130, through lines 116-118, urged by pumps 125-126. Diadiluent is introduced at points of introduction of a diadiluent 139-141 at the indicated stages from $B_1$. $B_2$ and $B_3$. In continuous diafiltration, the volumes of the permeates of filtrates $F_1$-$F_3$ are substantially equal to the respective volumes of the added diadiluent fluids at $B_1$-$B_3$ (139-141). In discontinuous diafiltration, the volumes of the permeates of filtrates $F_1$-$F_3$ are greater than the respective volumes of the added diadiluent fluids $B_1$-$B_3$. The volumes labeled $F_n$ may be the same or different. The final step, deposited into Output 1 is concentrated relative to the original fluid because the final filtration step did not include the addition of diadiluent.

Figure 2:
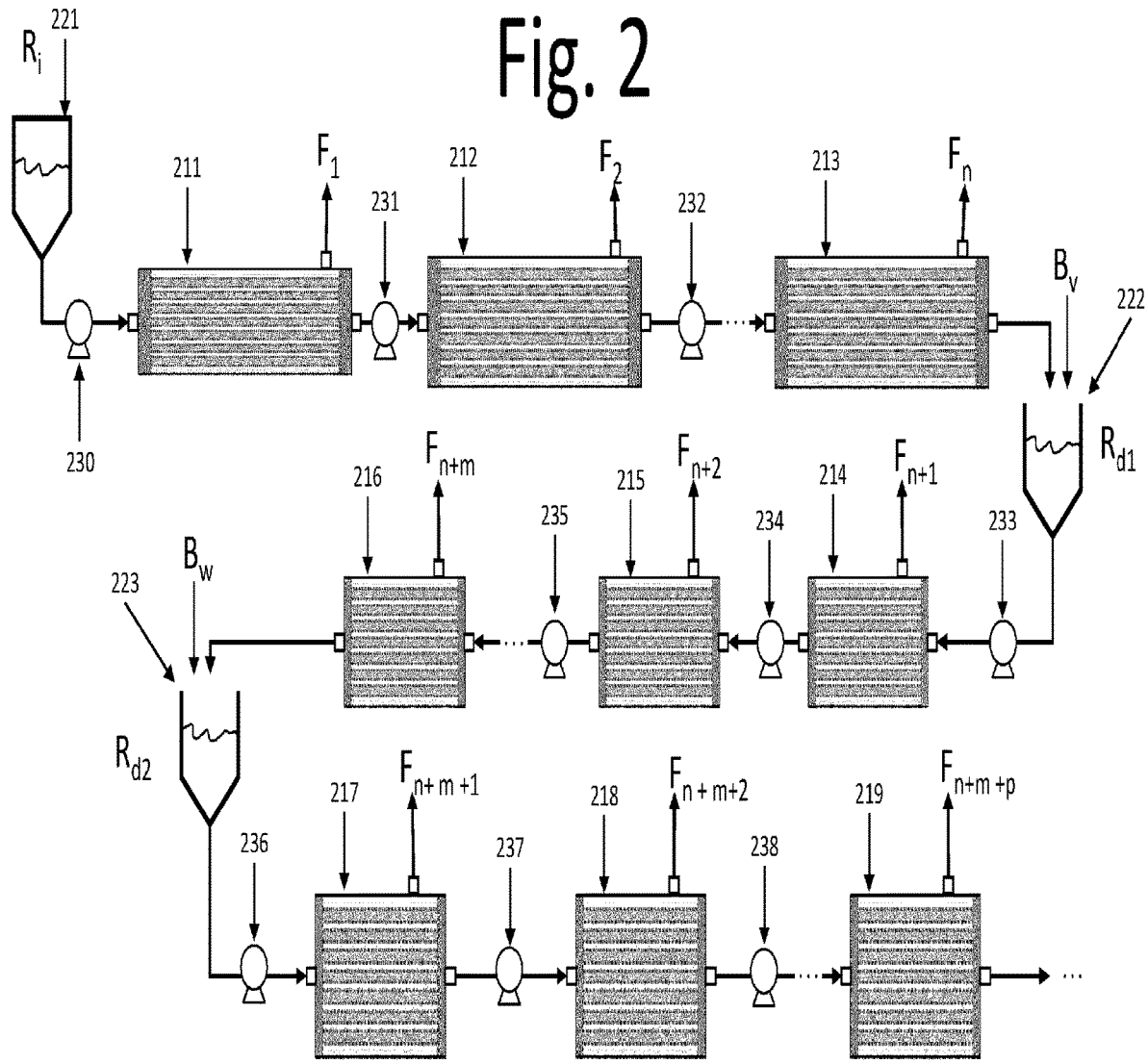
FIG. 2 depicts a schematic diagram of an embodiment of a cross flow discontinuous diafiltration system having a plurality of segments, each having a filtrate port, and two points of batch mode diadiluent introduction. Further, the FIG. 2 depicts an optional plurality of segments for concentration of the retained solute by removing filtrate.
Figure 3:
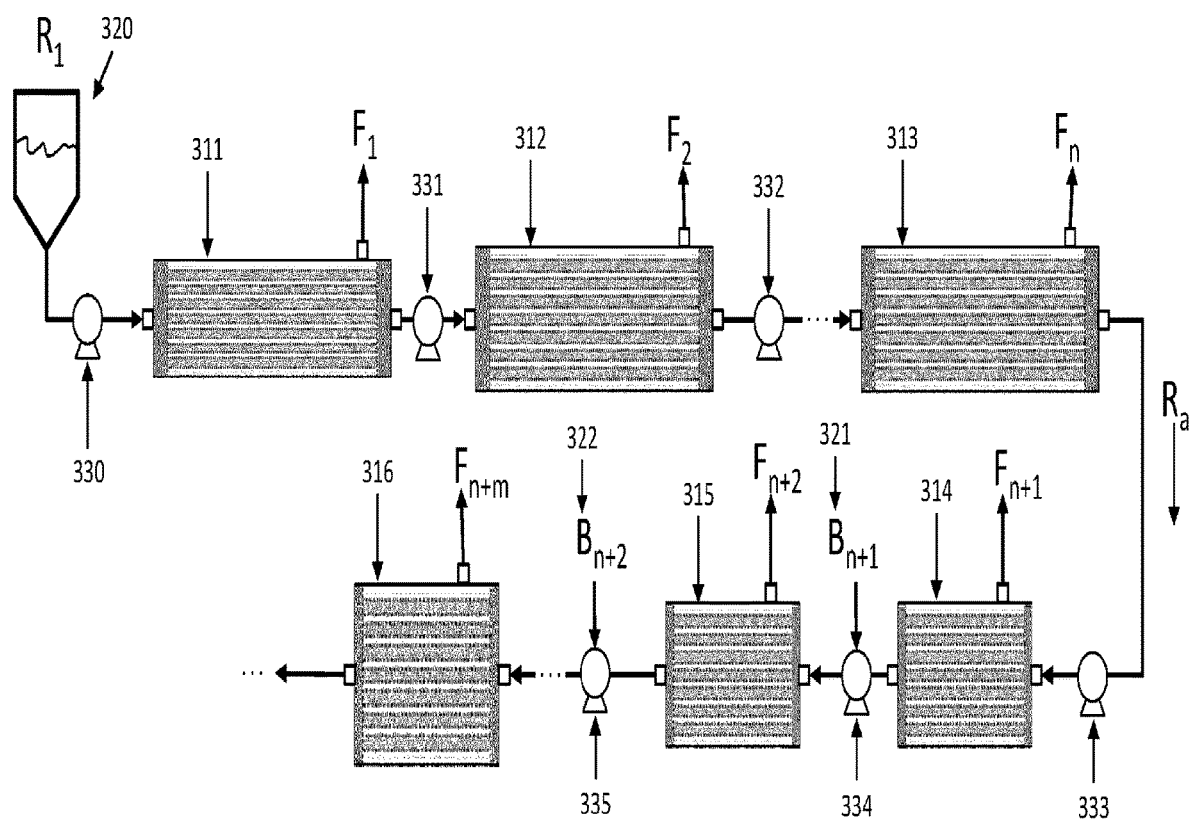
FIG. 3 depicts another embodiment of a cross flow continuous diafiltration system having a plurality of filtration segments, each having a filtrate port and a plurality of points of introduction of diadiluent.

FIG. 2 depicts a schematic diagram of an embodiment of a cross flow discontinuous diafiltration system having a plurality of segments, each having a filtrate port. Further, FIG. 2 depicts an optional plurality of segments for concentration of the retained solute by removing filtrate of volumes $F_n$. Pumps 230-236 and filtration stages 211-217 are as shown. The feed of the material to be processed is at 221. At reservoir 222, ($R_{d1}$) diadiluent of volume $B_n$ is added to the retentate solution from two or more stages such that the volume of diadiluent is substantially equal to the sum of the volumes of the permeates $F_1 \ldots F_n$ obtained from the various stages. At reservoir 223 $R_{d2}$ is added to the retentate solution from two or more stages such that the volume of diadiluent $B_w$ is substantially equal to the sum of the permeates $F_{n+1} \ldots F_{n+m}$ obtained from the various stages. In this example, in-process materials are urged through the system FIG. 3 depicts another embodiment of a cross flow continuous diafiltration system having a plurality of filtration segments 311-316, each having a filtrate port. The introduction of diadiluent 321-322 occurs in-line at multi-feed pumps 334-335. The fluid to be processed at $R_1$ 320 is urged through the filtration segments by pumps 330-335, while expelling permeate filtrate volumes $F_1, F_2, \ldots F_{n+1}$, respectively. Diadiluent of volume $B_{n+1}$ 321 is added as the solution is pumped through a subsequent filtration step in which permeate filtrate $F_{n+2}$ is expelled. Diadiluent of volume $B_{n+2}$ 322 is then assed as the solution is pumped through an optional further filtration step. In this example, the volumes of $B_{n+1}$ and $B_{n+2}$ are metered such that $B_{n+1}=F_1+F_2+ \ldots F_{n+1}$ and $B_{n+2}=F_{n+2}$ or $B_{n+2}+B_{n+1}=F_1+F_2+ \ldots F_{n+2}$, with the latter scheme allowing for the possibility of different apportionment of diadiluent volumes.

Figure 4:
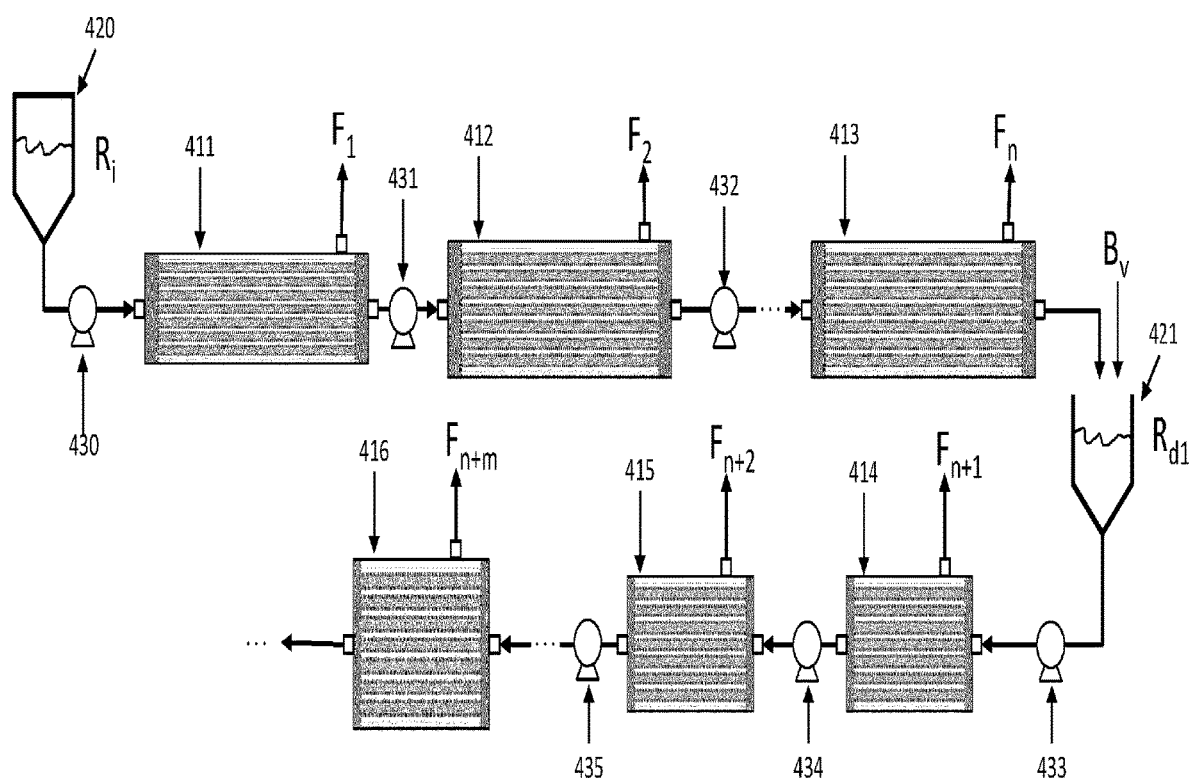
FIG. 4 depicts a schematic diagram of an embodiment of a cross flow discontinuous diafiltration system having a plurality of segments, each having a filtrate port, and a point of batch mode diadiluent introduction. Further, the FIG. 4 depicts an optional plurality of segments for concentration of the retained solute by removing filtrate.

FIG. 4 depicts a schematic diagram of an embodiment of a cross flow discontinuous diafiltration system having a plurality of segments 411-413, each having a filtrate port. Further. FIG. 4 depicts an optional plurality of segments 414-416 for concentration of the retained solute by removing filtrate. The fluid to be processed at $R_1$ is urged through the filtration segments by pumps 430-435, while expelling permeate filtrate volumes $F_1, F_2, \ldots F_n$, respectively; after which the retentate fluid is added to a reservoir 421. Diadiluent of volume $B_v$ is added to the reservoir such that $B_v=F_1+F_2 \ldots +F_n$, and the solution is mixed. The solution is pumped through a subsequent filtration step in which concentrates the fluid by removing a volume of permeate filtrate volume equal to $F_{n+1}+F_{n+2} \ldots +F_m$.

Figure 5:
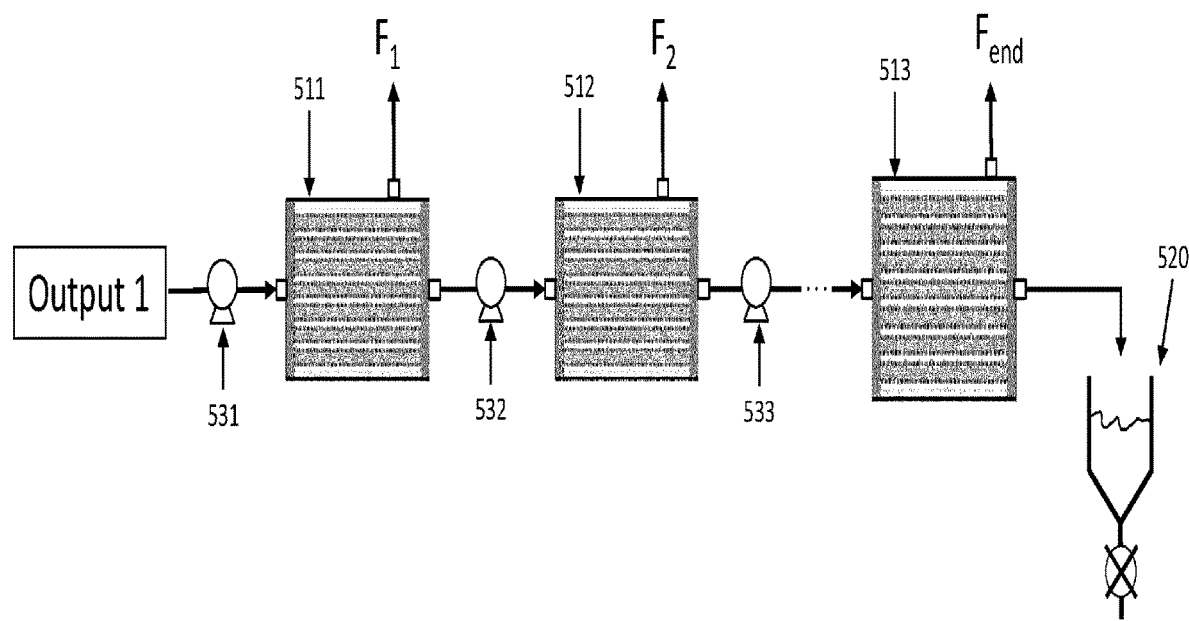
FIG. 5 depicts a plurality of cross flow filtration segments for concentration of the diafiltered output from FIG. 1.

FIG. 5 depicts an optional plurality of cross flow filtration segments 511-513 for concentration of the diafiltered output from FIG. 1, FIG. 3, or FIG. 4. Fluid is urged through filtration stages 511-513 by pumps 531-533 and deposited into reservoir 520.

More elaborate manifolds such as those known in the art can be used without departing from the scope of the claims appended hereto. For example, some manifolds fitted to cross flow filter cartridges permit series filtration through fibers within the same cartridge. In other embodiments, filtration segments may be mounted such that they are fluidly connected in parallel to form a compound filtration segment, n, may comprise fibers of the same inner diameter as those in upstream filtration segment n−1, provided that no filtration segment, compound or otherwise, contains fibers having larger inner diameters in an upstream filtration segment, compound or otherwise, and that n can be chosen so that at least one downstream filtration segment, compound or otherwise, contains fibers having larger inner diameters than those in an upstream filtration segment.

DETAILED DESCRIPTION

As used herein, the conjunction "and" is intended to be inclusive and the conjunction "or" is not intended to be exclusive unless otherwise indicated or required by context. For example, the phrase "or, alternatively" is intended to be exclusive. As used herein, it is intended that the terms "cross flow filtration" and "tangential flow filtration" are synonymous. As used herein, the term "exemplary" is intended to point to an example but is not intended to indicate preference. As used herein, the term "about" is understood as within a range of normal tolerance in the art, for example within 2 standard deviations of the mean. For example, the deviation from the nominal value modified by the term "about" may be due to limitations imposed by hardware such as fittings, mounting fixtures, securing structures and the like. "About" can further be understood as being within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." As used herein, a "filtration system" is understood to comprise one or more filtration modules and may further comprise pumps, valves and other ancillary equipment. As used herein, a "filtration module" is understood to comprise one, two or more filtration segments, fluidly connected as prescribed. As used herein, a "filtration segment" is understood to comprise a housing and one or more filter membranes. As used herein, a "compound filtration segment" is understood to comprise two or more filtration segments fluidly connected in parallel.

As used herein, a component is said to be fluidly connected to another component regardless of whether there are control devices between the two components. Control devices include pumps, valves, restrictors, pressure or volume regulators or the like.

As used herein, a diadiluent is a solution or other fluid having dispersed components comprising a solvent and, optionally, buffers, optionally non-buffering salts, optionally osmotic concentration adjusters, optionally rheology modifiers, optionally buffering or nonbuffering nonionic or zwitterionic solutes such as sugars, imidazoles betaines, or amino acids, optionally serum plasma constituents, optionally anticoagulation factors, optionally antibacterial or antiviral ingredients, optionally nonionic, anionic, cationic or zwitterionic surfactants or combinations thereof or any other constituent that may be desired in the final or intermediate product. The diadiluent may comprise water, an organic solvent or a combination thereof.

As used herein, the term "substantially equal" is used with the understanding that minor errors in the concentration of the retained solute of interest at some stage in filtration may be adjusted during subsequent filtration or additions of solvent to provide more accurately the desired concentration. Accordingly, if it is said that the one quantity of fluid is substantially equal to another, a concentration tolerance of +/−15% would not depart from the scope of the invention. Further, it should be understood that the examples are not limiting in that regard.

As used herein, a point of introduction of a diadiluent may comprise a multi-component module, having any one or all of a reservoir, a fluid output from another process, such as a synthesis module, a blending module for blending one or more solvents and/or one or more solutes, a filtration module, or the like. A point of introduction of a diadiluent may also include one or more control modules for controlling pressure, volumes, temperatures, or the like, including heaters, chillers, pumps having one or more input lines, automatic or manual valves, flow restrictors, active or automated flow controllers or the like.

As used herein, a fluid having dispersed components may be a solution, a stable micellar or colloidal suspension, or a coarser suspension which is stable during a time suitable for its application.

Disclosed herein is a single pass cross flow diafiltration system comprising a filtration module, said filtration module comprising: (a) two or more filtration segments fluidly connected in series, each having an upstream side and a downstream side; wherein each filtration segment comprises hollow fiber filter membranes, and wherein each filtration segment has a selected length; wherein the hollow fiber filter membranes of each filtration segment have a selected inner diameter; wherein the selected inner diameter of each filtration segment may be the same or different, provided that at least one selected inner diameter differs from another selected inner diameter, and provided that the two or more filtration segments are arranged such that no selected inner diameter in a given filtration segment is larger on the upstream side; (b) one or more pumps, mounted to urge fluid flow; and (c) one or more points of introduction of a diadiluent, each of said points of introduction being fluidly connected to an upstream filtration segment.

Further disclosed herein is a method of single pass, cross-flow diafiltration, comprising: (a) providing two or more filtration segments fluidly connected in series, each having an upstream side and a downstream side; wherein each filtration segment comprises hollow fiber filter membranes, and wherein each filtration segment has a selected length; wherein the hollow fiber filter membranes of each filtration segment have a selected inner diameter; wherein the selected inner diameter of each filtration segment may be the same or different, provided that at least one selected inner diameter differs from another selected inner diameter, and provided that the two or more filtration segments are arranged such that no selected inner diameter in a given filtration segment is larger on the upstream side; (b) providing one or more pumps, mounted to urge fluid flow; (c) providing one or more points of introduction of a diadiluent, each at a point wherein one or more previous upstream segments have produced a volume of permeate; (d) measuring the volume of permeate from the one or more previous upstream segments; and (e) introducing a selected volume of diadiluent to the retentate from the one or more previous upstream segments.

Further disclosed herein is a diafiltration system comprising: a plurality of stages, each stage having a plurality of hollow fiber filter membranes, providing at least one serial flow path, each stage being in fluid communication with each adjacent stage preceding it and being in fluid communication with any adjacent stage that follows it, the improvement comprising: means for controlling permeate flux.

As will become evident, various modifications and enhancements of the above embodiments are within the scope of the subject matter disclosed and claimed herein.

Hollow fiber membranes often enable tangential flow filtration where the bulk fluid or "feed" flows across the surface of the membrane while the ingredients being filtered permeate through the membrane's pores. Closing off the hollow fiber at one end results in what is known as "dead-end" filtration. Under such conditions, the ability to sustain tangential flow may be limited. The fluid passing through the membrane is referred to as the permeate or the filtrate, while the fluid passing over the membrane without passing through it is referred to as the retentate or the concentrate. Because the permeate flow is approximately perpendicular to the bulk fluid flow through the fibers, it is also referred to as cross flow filtration. There are two flow configurations for permeate through a hollow fiber membrane: flow from inside to outside the fibers or flow from outside to inside the fibers; the filtration membrane may enable flow in both directions.

The pores in the semi-permeable hollow fiber membrane can range from approximately 0.001 to 100 m (microns). Further, there are various categories of membrane, depending on the average pore size: microfiltration and ultrafiltration. Microfiltration membranes have pores ranging from approximately 0.1 micrometers to 100 micrometers, while an ultrafiltration membrane has pores ranging from approximately 1 nanometers to 0.1 micrometers. Such a membrane may also be expressed by its ability to fractionate proteins, nucleic acids and other polymers by size. For example, an ultra-filtration membrane may have a molecular weight cutoff (MWCO) range from 1,000 to 1,000,000 Daltons, pertaining to the approximate molecular weight of the polymer retained by the ultra-filtration membrane.

Suitable materials of construction for hollow fiber filter membranes include, without limitation, hydrophobic materials, hydrophilic materials and amphiphilic materials. In addition, some materials, such as polyamides may display bulk hydrophilic properties and surface hydrophobic properties. Without intending to be bound by theory, the degree of hydrophobicity or hydrophilicity may permit wicking of the carrying solvent through the pores of the filter membrane; thus influencing selectivity, and/or non-specific or amphiphilic binding of the molecules to the membrane.

More specifically, materials of construction may be organic or inorganic with inorganic ceramic filters useful where filtration at extreme temperatures is carried out. Organic materials, such as polymers, may be used at moderate temperatures of about −100° C. to about 300° C. in some cases, although certain organic polymers may be suitable for higher temperature use. Hydrophobic materials of construction include, without limitation, polysulfone, polyethersulfone, polypropylene, polyethylene, polyvinylidene fluoride, hydrophobic poly tetrafluoroethylene (PTFE), hydrophobic polyamides and the like. Hydrophilic materials of construction include, without limitation, polylactic acid and analogous polymerized hydroxy acids, cellulose acetate, mixed cellulose esters, hydrophilic polyamides, and the like. The monomer repeat units of the foregoing polymers may be used in copolymers to adjust polymer physical properties, and to obtain the desired levels of hydrophobicity and hydrophilicity. Such amphiphilic materials may provide the opportunity for greater selectivity. In addition, amphiphilic materials may provide self-organizing properties. For example, it is known that certain block copolymers comprising two or more monomer units that are insoluble in one another can undergo self organization, wherein blocks comprising the monomer units separate from one another and form domains. Such self organized materials are another example of amphiphilic materials. It is further understood that certain of the foregoing polymers may display interesting electrical properties. For example, polyamides, such as the odd nylons, and polyvinylidine fluoride are ferroelectric materials. Such properties may also be useful in filtration applications.

Filter pore structures vary widely. While no limitation is intended, several examples are provided herein. In some applications, it may be advantageous to employ a filter having track-etched pores, which may be formed using some form of radiation such as alpha particles. Track-etched pores have approximately columnar or branched columnar structures. In other applications, filter pores having a fused network structure may be appropriate. Still other applications may benefit from using fibrous pore structures. In other applications, pores may comprise cells or chambers with openings in their walls that allow a fluid to flow between them. It is further understood that the structure of the pores is also influenced by the pressure drop across the membrane.

Bundles of hollow fiber membranes, usually having similar diameter and pore size, may be sealed in potting material such that, when in use, the interiors of the fibers are accessible to a fluid manifold without contaminating the permeate on the outsides of the fibers. Suitable potting materials include, without limitation, heat and light curable resin formulations, other room temperature curable resin formulations, polymer melts, fusible powders and other encapsulants. Exemplary potting materials include, without limitation, epoxy resins, urethane resins, aminoplast and amidoplast resins, alone or mixed with phenolic or other suitable resins, silicone resins, heat or ultraviolet curable (meth)acrylic resins, polyester resins and hot melt waxes and resins.

Filtration segments may be modular cartridges wherein the hollow fiber membranes are enclosed in a self-contained module. Depending on the required capacity, filtration segments may be arranged and fluidly connected in parallel or in series. The filter membrane surface area available for filtration in the cartridge can be calculated by multiplying the surface area of each fiber by the number of fibers sealed the cartridge housing.

Depending on requirements, filter segments may be arranged in series or in parallel. The parallel arrangement provides a convenient way to add membrane surface area by adding filtration segments, rather than using larger filtration segments having more fibers. The series arrangement of filtration segments allows staged filtration with less buildup of solute or gel layer at the filter wall.

The hollow fiber membrane's pores allow biomanufacturing ingredients to be separated from the bulk fluid mixture. A biomanufacturing ingredient is a component of the mixture which can be purified or separated by semipermeable membrane filtration. These ingredients include, but are not limited to, biomanufactured products, solutes, buffers, and contaminants. The biomanufactured product is the molecule of interest and is separated from the other biomanufacturing ingredients by the filter membrane. Separation of the product from the fluid mixture can occur by choosing a membrane to retain the product while allowing other ingredients to pass through. Alternatively, the membrane may be chosen to allow the product to permeate through the membrane while retaining the higher molecular weight ingredients, such as aggregates or contaminants larger than the fiber pore size, to be in the retentate.

Without limitation, materials to be filtered may include ionic materials such as salts, acids bases and buffers, amphoteric materials, zwitterions, organic solvents, water, ionic solvents, microcrystals, latex particles, cross-linked polymers, polymers physically associated into aggregates, chemically or physically linked polymer microgels, aggregates of highly cross-linked polymers, emulsified particles, clumps of associating proteins, microbes, cellulosic debris, latex and emulsion particles, clusters and fibers comprising of biological cells and fibers, cell organelle fragments, incompletely dissolved polymers, proteinaceous particles, cellulosic and other polysaccharide particles, flocculating particles, precipitating particles, phase separating liquid systems, salt crystals, particles due to oxidation or reduction processes, pyrogens, cell debris, cell suspensions, food products, particles emanating from the reaction or process vessel itself, and, aggregated therapeutic proteins.

The inner diameters of the hollow fibers, often referred to as the "lumen diameters" may be of any size, and no size limitation is intended. Notwithstanding, it is frequently convenient to select from among commercially available options. Small sized fibers provide higher surface to volume ratios at the possible expense of higher shear rates, increased pressure drops, which, in turn, may affect pump selection and the ability to effect filtration, and slower axial velocity, depending on the fluid viscosity, solids load, and propensity to form gel layers. Fibers having higher inner diameters may allow for faster axial velocity at lower surface to volume ratios. Inner diameters may range from about 0.1 mm to about 3.0 mm. Within this range, hollow fiber filter membranes may have inner diameters between about 0.5 mm to about 2.0 mm. In particular, inner diameters may be selected from about 0.5 mm, about 0.63 mm, about 0.7 mm, about 0.75 mm, about 1.0 mm, about 1.4 mm, or about 1.9 mm.

The nominal lengths of the hollow fibers may be of any size, and no size limitation is intended. Notwithstanding, it is frequently convenient to select from among commercially available options. Accordingly, lengths of fibers may vary from their nominal values by as much as 2 cm, depending on the configuration of the filtration segment housing and the potting material. Shorter length fibers allow lower inlet pressures to achieve the same axial velocity as compared to longer fibers of the same inner diameter at the possible expense of filtration efficiency. Longer fibers may offer higher filtration efficiency but may require higher inlet pressure and fluids flowing through them will undergo greater pressure drops and higher shear rates than those flowing through shorter fibers having the same inner diameter. When fibers are arranged linearly and approximately in parallel, their lengths will correspond to the length of the filter segment. Fiber lengths may range from about 12.5 cm to about 150 cm. Within this range, hollow fiber filter membranes may be about 20 cm to about 120 cm long. In particular, fiber lengths may be selected from about 30.5 cm (12 in.), about 61 cm (24 in.), or about 104.1 cm (41 in.). Longer filtration channels may be obtained by arranging two or more filter segments such that the retentate channel of one filter segment is fluidly coupled to the input channel of another filter mounted downstream. In this way, longer filtration paths can be achieved using readily available filter components.

Notwithstanding the foregoing, fibers may also reside in flexible housings wherein coiled fibers are mounted. In such a system fibers would be coiled in "corkscrew" fashion, such that they may be longer than the filter housing.

Within this range, such housing may have lengths between about 13 cm (5 in.) and 127 cm (50 in). In particular. Filter segment housings may be selected from about 30.5 cm (12 in.), about 61 cm (24 in.), or about 104.1 cm (41 in.). Longer filtration channels may be obtained by arranging two or more filter segments such that the retentate channel of one filter segment is fluidly coupled to the input channel of another filter mounted downstream. In this way, longer filtration paths can be achieved using readily available filter components. Filter modules of higher capacity may be obtained by fluidly coupling multiple filtration segments in parallel, with the inputs supplied by the same feed.

Within a filtration segment, there may be any number of hollow fiber filter membranes and no numerical limitation is intended. Notwithstanding, it is frequently convenient to select from among commercially available options. Accordingly, a filter segment may have from 1 to about 100,000 hollow fiber membranes, depending on the diameter of the fiber and the dimensions of the filter housing. For example, a 15.2 cm (about 6 inch) inner diameter filter segment housing may have 50,000 or more 0.25 mm hollow fiber membranes within it.

Precision pumps such as metering pumps move a precise volume of liquid in a specified period of time; thus providing an accurate flow rate. In this way, pressure may be applied to assist in regulating permeate flow. Without limitation, pumps may include reciprocating piston pumps, syringe pumps, rotational pumps, gear pumps, peristaltic pumps, diaphragm pumps or the like. Drive motors on the pumps may include electronically driven motors such as stepper motors, pneumatic motors, electric motors or the like. Moreover, the motor may act as a sensor to indicate the level of resistance imposed by the diafiltration system. For example, the electric current of the motor can be monitored to indicate how much work is being done to maintain a given level of permeate flux.

The pumps shown in FIG. 1-FIG. 4 may have more than one input as shown in order to enable the in-line mixing of the fluid flowing in the retentate channel with the diadiluent fluid. Such a pump may be assembled using a multi-channel pump such as might be constructed with two or more pump heads coupled to the same drive mechanism. For example, a multichannel peristaltic pump such as the Fisherbrand™ FH100M Multichannel Peristaltic Pump, available from Fisher Scientific Company, might be configured such that the diadiluent is taken into one channel of the multichannel peristaltic pump, while the retentate channel is taken into the second channel of the multichannel peristaltic pump. The respective outputs are then fluidly connected by means of, for example, a 3-way connector to form a single output channel.

It should be noted that such a configuration is not necessarily limited to peristaltic pumps. For example, in cases where shear stress may damage the solute, multichannel diaphragm pumps may be employed. Moreover, combinations of different kinds of pumps may be used within the contemplated scope of the invention. For example, a diaphragm pump, fluidly connected to the retentate channel, may be coupled to a peristaltic pump, fluidly connected to the diadiluent channel such that the respective outputs are fluidly connected via a 3-way connector to produce a single output. The pumps may run separately or they may be electronically in communication, programmed to maintain a constant output volume per unit of time or alternatively, a selected concentration of solute. Various gauges, flow meters and the like may be employed as described infra.

In addition to pumps, pressure sensors and flow meters may be employed to monitor conditions and maintain process control. Pressure sensors may include, without limitation, diaphragm pressure gauges, capacitive pressure sensors, electromagnetic inductance pressure sensors, piezoelectric, pressure sensors, piezoeresistive, pressure sensors, optical pressure sensors potentiometric pressure sensors, MEMS pressure sensors or the like. Flow meters may include, without limitation, mechanical flow meters or electronic flow meters. Mechanical devices include, without limitation, radial turbines, propeller-type turbines, vane type instruments, linear resistance meters, vortex flow meters and the like. Electronic flow meters include, without limitation, ultrasonic Doppler anemometers, laser Doppler anemometers, magnetic flow meters, Coriolis flow meters, and the like. It may be convenient to use different flow and pressure sensing devices when liquids or gases are being processed.

Control of the trans-membrane pressure may be manual or it may be accomplished by electronic control. Manual controls may provide electrical or mechanical engagement such that the pump motors are switched on and off to hold a preset permeate flux tolerance. Simple manual controls may include pinch clamps, switches, capacitive devices or other ways of achieving electrical engagement. In addition, the controller may comprise a logic circuit or a computing device such as a processor, operatively coupled to the controls as well as to sensors, actuators and the like. Actuators, may be employed to engage automatically to control pumps and valves.

Processors may comprise any circuit for performing data processing, including digital signal processors, single processors, parallel processors, analog processors, memory management processors, optical processors, equivalents thereof and combinations thereof. In addition, processors may include auxiliary circuits, either integrated with the processor or in separate devices operating with the processor. Auxiliary circuits may be any circuit that provides an additional function on behalf of the processors and can be shared between two or more processors. Auxiliary circuits may include memories such as semiconductor memories, magnetoresistive memories, disk memories, flash memories, or any equivalent means for storing data. Auxiliary circuits and logic devices may comprise gate arrays, adders, other programmed logic circuits, amplifiers, triggers, A/D converters, D/A converters, optical interfaces, serial and parallel interfaces, buffers, masking circuits, encryption circuits, direct memory access circuits, equivalents thereof or combinations thereof.

Program logic may comprise computer programs written in any known language, such as C. C++, Pearl, Fortran, Basic, Pascal, assembly language, machine language, equivalents thereof or combinations thereof. Program logic may further comprise parallel processing logic for employing multiple processors or processor cores, direct memory access logic for continual monitoring functionality, masked direct memory access, interrupt routines, interrupt service routines, equivalents thereof or combinations thereof.

Table lookup logic may comprise interpolation and extrapolation routines, based on polynomials, spline functions, rational functions, normalized spectral elements, equivalents thereof or combinations thereof. Further, table lookup logic may comprise ordered table searching, searching with correlated values, estimation by neural networks, multidimensional estimation, equivalents thereof or combinations thereof. Data for table lookup may be obtained experimentally.

The processor may gather data using various sensors and other devices, such as pressure sensors, flow sensors, accelerometers, actuators and the like. By monitoring the various inputs, the permeate flux may be adjusted continually in each permeate channel.

Pressure sensors may comprise piezoelectric sensors, piezoresistive sensors, capacitive sensors, which may comprise foams or other elastic materials as well as ceramics and fluids, electromagnetic sensors, in which the physical displacement of a diaphragm or cantilever causes changes in inductance, reluctance or capacitance, a linear variable differential transformer device. Hall effect devices, equivalents thereof or combinations thereof.

Some fluids such as those that contain monoclonal antibodies may exhibit exceptionally high viscosity. Under some circumstances, viscosity lowering excipients may be used. Such materials have a wide range of biophysical-chemical properties. They may modify viscosity, aggregation propensity, or stability. Such excipients include amino acids or their salt forms such as alanine, proline, valine, glycine, serine, histidine (HCl), lysine (HCl), arginine (HCl), and sodium glutamate. In addition, pharmaceutically acceptable salts may be used such as NaCl. NaOAc, $Na_2SO_4$, and $NH_4Cl$. In some embodiments, chaotropic reagents such as urea, imidazole, betaine, or guanidinium chloride may be used. It is understood that the organic materials listed herein as excipients may be employed as salts or as their parent compounds. Suitable pharmaceutically acceptable salts include acid addition salts which may, for example, be formed by reacting a compound of interest with a suitable pharmaceutically acceptable acid such as hydrochloric acid, sulfuric acid, fumaric acid, maleic acid, succinic acid, acetic acid, benzoic acid, citric acid, tartaric acid, carbonic acid or phosphoric acid.

Parameters such as axial velocity, shear rate and its associated shear stress, axial pressure drops and trans-membrane pressure drops are of operating significance because of the sensitivities of the target materials to mechanical and fluid mechanical factors. For example, using too high a linear axial velocity may result in a precipitate that is too finely divided because of too high a shear rate. This is of relevance in purifications of plasmid DNA; wherein it is desirable to keep the genomic DNA concentration as low as possible in the separated plasmid DNA sample.

As another example, certain biopolymers such as plasma proteins are sensitive to shear rate; which sensitivity has physiological significance. Of such proteins, one example, the von Willebrand factor (VWF), may undergo unfolding at high shear. The unfolded VWF adheres to substrates such as collagen and provides a template for platelet adhesion and eventual clotting of blood. In small blood vessels, an opening such as a wound may result in a high shear situation which, in turn triggers unfolding of VWF and the subsequent clotting response. Within a hollow fiber filter, high velocities may give rise to shear rates that may denature VWF or similar materials. Filtration of folded VWF without damaging it may be accomplished by maintaining the shear rate below 2300 sec$^{-1}$, below 2000 sec$^{-1}$, or below 1800 sec$^{-1}$.

During the filtration process, a concentrate may form on the walls. Concentrates may increase in viscosity, often according to a power law or other function such as a polynomial or supralinear function of concentration. The nature of the function will depend on the particular intermolecular interactions between solvent molecules, solvent and solute molecules, and solute molecules interacting with each other. In one embodiment, the concentration may be collected in the course of uninterrupted flow. Alternatively or in combination, the concentrate may be collected by periodically flushing it from the walls of the membranes, using a back pressure, applied from the permeate compartment by operating the pump(s) in reverse or the feed compartment by operating the feed pumps in reverse, as appropriate, or by closing off the permeate flow in a frequency to ensure some of the concentrate is going back into the bulk flow. Further flushing with buffer solution may also serve to dilute the concentrate sufficiently to allow collection. Within certain limits, it may be possible to promote collection of the concentrate by increasing temperature, although care should be taken to avoid temperature induced denaturation.

Filtration segments may be prepared as custom units or be purchased as commercially available units. The filtration segment inner diameter refers to the inner diameter or equivalent inner dimension of the filter housing, wherein the hollow fibers reside. No limitation is implied on a filtration segment inner diameter. Notwithstanding, aqueous filters for biological systems, for example, may be conveniently chosen to have filtration segment inner diameters between about 0.5 cm and about 26 cm. As a further example, filtration segment inner diameters may be chosen to be between about 0.95 cm and about 16 cm.

For a given filtration segment, the shear rate of a Newtonian fluid within the hollow fiber filter membrane may be approximated by $$\dot{\gamma} = \frac{169766 \cdot Q}{N_f d^3}$$

where $\dot{\gamma}$ is shear rate, Q represents the flow rate of the feed in liters/min, $N_f$ is the number of fibers in the filtration segment and d is the inner diameter of the fibers in mm. The constant, 169,766, may be regarded as a suitable first approximation but may be refined using empirical data for a given system. The resulting stress attributable to the shear rate is given by $$\tau_w = \dot{\gamma} \mu$$

where $\tau_w$ represents the shear stress, and represents the dynamic viscosity of the fluid in the retentate channel.

Further, within a given filter segment, the axial velocity, $u_x$, for a Newtonian fluid may be modeled by the following:

$$u_x = \frac{21.22 \cdot Q}{d^2 N_f}$$

wherein the variables are as defined, supra. As above, the constant, 21.22 may serve as a reasonable first approximation, which may be refined using experimental data. Alternatively, $u_x$ may be measured empirically using Doppler ultrasound measurements if the lumen diameter is sufficiently large.

Further, within a given filter segment, the pressure drop across that segment may be approximated by $$\Delta P = \frac{101130 \cdot \mu l_f Q}{N_f d^4}$$

wherein the constant, 101.130, may be used as a reasonable first approximation. Actual measurements of pressure drop are accomplished with monometers or other pressure meters at the entrance and exit ports of a filtration stage. Continual collection of pressure drop data may allow for adjustment of the constant as filtration proceeds.

The permeate flux or flow velocity depends on fluid parameters such as viscosity, solids loading and the propensity to form gel layers. Accordingly, a priori calculations of the permeate flux may result in estimated values having some level of error. Notwithstanding, control of the permeate flux can be accomplished by varying other factors, such as fiber membrane inner diameter, pore size, pore density at the membrane surface, resistance to flow by membrane pore density, and variation of the trans-membrane pressure. The flux may then be monitored empirically. The trans-membrane fluid velocity, v is related to the permeate flux, J in the following way:

$$v = J \cdot A = \frac{\Delta P_{TM} A N_f}{(R_m + R_c)\mu} = \frac{\Delta P_{TM} \mu d^2 l_f N_f}{4(R_m + R_c)\mu}$$

where $\Delta P_{TM}$ represents the trans-membrane pressure, A is the inner area of the hollow fiber, $R_m$ and $R_c$ represent the resistances of the membrane and "cake", respectively, and the other variables are as defined supra. It should be noted that the "cake" resistance $R_c$, may represent resistance due to the buildup of solid matter on the inner fiber wall, a gel built up on the inner fiber wall, or both.

As for diafiltration, two common methods of carrying out diafiltration processes include the batch process, as represented in FIG. 2, which uses a fixed volume of fluid contained in a vessel. The fluid is circulated from the vessel through a membrane module, while adding diluent to replace the permeate. When the rate of addition of diafiltrate is the same as the rate of permeation the process is commonly referred to as "constant volume or continuous diafiltration." A standard material balance on the low molecular weight compounds yields the following prediction for the decontamination factor, $DF_B$.

$$DF_B = \exp\left((1-R) \cdot \frac{V_{df}}{V_{ret}}\right)$$

$$R = \left(1 - \frac{c_p}{c_r}\right)$$

Wherein the decontamination factor is related to the rejection factor, R, $c_p$ and $c_r$ are the permeate and retentate concentrations respectively, $V_{df}$ is the total volume of diadiluent used to achieve the specified decontamination factor and $V_{ret}$ is the (constant) volume of solution processed.

The second common process uses a series of interconnected stages. The fluid being purified passes from stage to stage. In each stage diadiluent is added at a rate equal to the permeation in that stage as depicted in FIG. 1. The decontamination factor, $DF_C$, for this process is given by the following equation.

$$DF_c = \left(1 + (1-R) \cdot \frac{V_{df,n}}{V_{ret,n}}\right)^2$$

Where, as before, R is the rejection factor for each stage, $V_{df,n}$ is the is the total volume of diadiluent at that stage used to achieve the specified decontamination factor, and $V_{ret,n}$ is the volume of solution processed at that stage.

A comparison of the two processes may be carried out using equal retentate volumes and equal decontamination factors. The following equation:

$$\frac{V_{df,n}}{V_{df,B}} = N \cdot \frac{\left[(DF)^{\frac{1}{N}} - 1\right]}{\ln(DF)}$$

Where N is the number of segments, DF is the decontamination factor and $V_{df,n}$ and $V_{df,B}$ are the diadiluent volumes for the for the staged and batch processes, respectively.

In any of the foregoing equations, the functions shown are not intended to be limiting but may take a variety of reasonable forms, particularly if adjustable parameters obtained from a fit or estimation technique are used. For example, the function $(R_m + R_c)$ may be interpolated and/or extrapolated using polynomials, spline functions, rational functions, normalized spectral elements and equivalents thereof or combinations thereof. Further, fitting techniques may include, without limitation, table lookup logic, which may comprise ordered table searching, or searching with correlated values, estimation by linear and nonlinear least squares, as appropriate, neural networks, geometric estimation. Monte Carlo estimation, multidimensional estimation, equivalents thereof or combinations thereof. Phenomenological constants or other fit estimates may be obtained especially for the configuration in question or they may be assembled from libraries comprising parameters obtained in previous calculations.

Diafiltration processes in which controlling concentration target liquid may be accomplished by using the above equations as guides for process optimization. If the ultimate goal is to produce a dialyzed retentate solution of a given target molecule concentration, is usually worthwhile to obtain the product with as little waste and as short a time as possible. Moreover, shear stresses may be an important factor. It may, therefore be desirable to minimize the shear stress within each filtration segment to avoid denaturation.

Although the present invention has been shown and described with reference to particular examples, various changes and modifications which are obvious to persons skilled in the art to which the invention pertains are deemed to lie within the spirit, scope and contemplation of the subject matter set forth in the appended claims.

What is claimed is:

1. A method of single pass, cross-flow diafiltration, comprising:
   a. providing three or more filtration segments fluidly connected in series, each having an upstream side and a downstream side; wherein each of the three or more filtration segments comprises hollow fiber filter membranes
   b. providing a first pump, mounted to urge fluid flow to the first filtration segment of the three or more filtration segments;
   c. providing one or more points of introduction of a diadiluent, each at a point between two or more upstream segments and one or more downstream segments of the three or more filtration segments, wherein the two or more upstream segments have produced a volume of permeate;
   d. providing one or more further pumps, each mounted between the three or more filtration segments to provide a single pump that urges fluid flow of retentate and introduced diadiluent from the one or more points of introduction of the diadiluent;
   e. measuring the volume of permeate from at least two of the two or more upstream segments; and
   f. introducing a volume of diadiluent to a retentate from the two or more upstream segments,
   wherein the volume of diadiluent that is introduced to the retentate is substantially equal to a sum of the measured volume of permeate from the at least two upstream segments.

2. The method of claim 1,
   wherein each of the three or more filtration segments has a length;
   wherein the hollow fiber filter membranes of each of the three or more filtration segments have a selected lumen diameter;
   wherein at least one selected lumen diameter differs from at least one other selected lumen diameter, and provided that the three or more filtration segments are arranged such that for a given filtration segment, having one of the selected lumen diameters, no filtration segment on the upstream side of the given filtration segment has a selected lumen diameter that is larger.

3. The method of claim 2, wherein the lengths of each of the filtration segments are chosen to be from about 4 inches to about 100 inches.

4. The method of claim 2, wherein the lengths of the three two or more filtration segments are chosen from 12 inches, 24 inches, and 41 inches.

5. The method of claim 2, wherein the filtration segments comprise a housing having a housing inner diameter, and wherein the housing inner diameter of each of the three or more filtration segments is about 0.5 cm to about 26 CM.

6. The method of claim 2, wherein the filtration segments comprise a housing having a housing inner diameter, and wherein the housing inner diameter of each of the three or more filtration segments is about 0.95 cm to about 16 CM.

7. The method of claim 2, wherein the selected lumen diameters of each of the three or more filtration segments are about 0.1 mm to about 5 mm.

8. The method of claim 1, wherein the fluid to be filtered comprises a viscosity lowering agent chosen from proline, histidine, lysine, arginine, glutamic acid, betaine, glutamine, asparagine, imidazole, pharmaceutically acceptable salts thereof and a combination of two or more thereof.

9. The method of claim 1, wherein the hollow fiber filter membranes have pore sizes from about 1 nanometers to about 500 micrometers.

10. The method of claim 1, wherein the hollow fiber filter membranes have pore sizes from about 10 nanometers to about 500 micrometers.

11. The method of claim 1, wherein one or more points of introduction of a diadiluent comprise a metering pump.

12. The method of claim 11, wherein the one or more points of introduction of a diadiluent comprise at least one reservoir.

13. The method of claim 1, further comprising:
 delivering the retentate from the two or more upstream segments into a reservoir;
 delivering the volume of diadiluent to the reservoir to form a solution with the retentate in the reservoir; and
 pumping the solution to one or more additional downstream segments of the three or more filtration segments.

* * * * *